May 9, 1939.                D. W. SHERMAN                2,157,353
                        X-BAR FOR AUTOMOBILE FRAMES
                             Filed Oct. 30, 1936
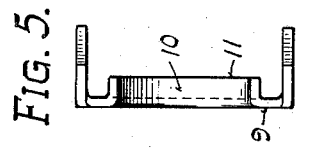
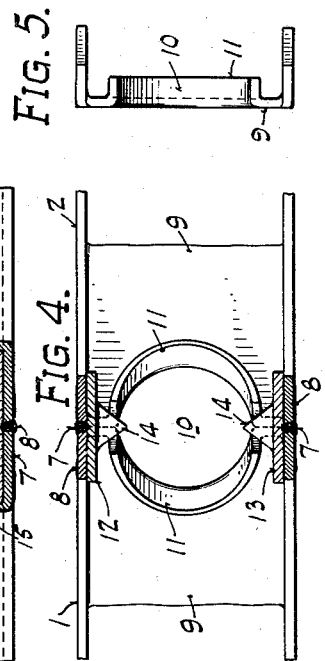
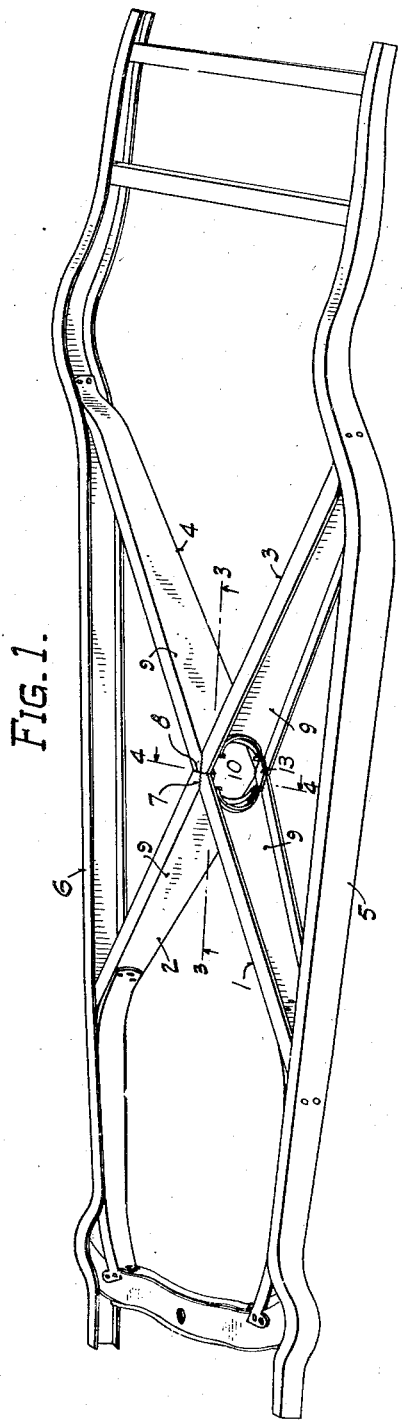
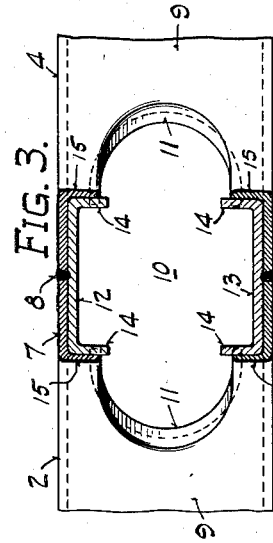
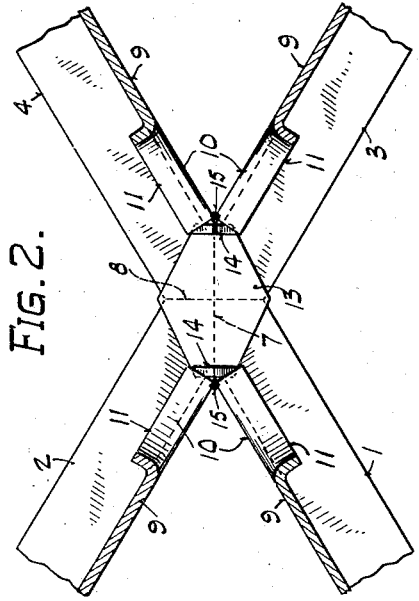
Donald W. Sherman
INVENTOR.
BY
ATTORNEY.

Patented May 9, 1939

2,157,353

UNITED STATES PATENT OFFICE 2,157,353

X-BAR FOR AUTOMOBILE FRAMES

Donald W. Sherman, Shorewood, Wis., assignor to A. O. Smith Corporation, Milwaukee, Wis., a corporation of New York Application October 30, 1936, Serial No. 108,322

4 Claims. (Cl. 280—106)

This invention relates to an X-bar for automobile frames.

The object of the invention is to provide an X-bar having its respective arms butt welded together at the center, making a unitary structure in effect constituted of a single piece of metal.

Another object is to provide such an X-bar of simple design that is of economical construction.

Other objects will appear hereinafter.

The accompanying drawing illustrates an embodiment of the invention and the views thereof are as follows:

Figure 1 is a perspective view of an automobile frame having an X-bar made from channel sections;

Fig. 2 is a longitudinal section through the central portion of the X-bar looking downward in Fig. 1;

Fig. 3 is a vertical section taken on line 3—3 of Fig. 1;

Fig. 4 is a vertical section taken on line 4—4 of Fig. 1; and

Fig. 5 is an end elevation of the inner end of a channel arm of the X member.

The invention is illustrated as utilizing channel section construction for the arms of the X-bar.

Referring to the drawing, the arms of the X-bar are made up of four channel members 1, 2, 3 and 4. These arms are arranged diagonally in the general form of an X and the forward arms 1 and 2 extend forwardly and outwardly and have their outer ends secured to the respective side rails 5 and 6 of the frame while the rearward arms 3 and 4 extend rearwardly and outwardly and have their outer ends secured to the respective side rails 5 and 6 of the frame.

The arms of the X-bar meet at a common center and are there welded together into an integral structure. For this purpose the upper and lower flanges of the arms are cut to a point as shown in Figs. 1 and 2 so that after assembly they provide the longitudinal central weld seams 7 and the transverse central weld seams 8.

The vertical webs 9 of the arms are cut away at the inner end to provide an opening 10 for the drive shaft of the automobile. The edges of the webs 9 at the opening 10 are flanged at 11 for strengthening purposes.

A reenforcing plate 12 is provided for the top flanges and another plate 13 for the lower flanges, and they are welded integral with the flanges at seams 7 and 8. The reenforcing plates 12 and 13 form a welding dam and chill for the deposit of weld metal at the meeting edges of the flanges. The welding is preferably done by the arc welding process employing a fusible metallic electrode to deposit weld metal at the joint and to fuse the same with the metal of the flanges and of the respective reenforcing plates 12 and 13.

The reenforcing plates are held in place during welding by downwardly bent flanges 14 thereon at the opposite corners which are supported on the flanges 11 of the vertical webs of the channels, as shown in Figs. 2 and 4.

The vertical webs 9 of the opposite pairs of arms meet at the center line of the X-bar and are welded together at 15, as shown in Figs. 2 and 3.

Various embodiments of the invention may be made within the scope of the claims.

The invention is claimed as follows:

1. In an automobile frame, an X-bar the arms of which have vertical webs and upper and lower horizontal flanges, said flanges having their inner ends cut at an angle and meeting to provide a butt welded joint therebetween forming a single unitary structure, said vertical webs being cut out at their meeting ends to provide a longitudinal opening through the center of said X-bar, and being welded together at their meeting end edges above and below said opening, and the arms of said X-bar being in substantial alignment across the center joint to provide for the transmission of stress from one arm directly to the one diagonally opposite.

2. In an automobile frame, an X-bar comprising a plurality of channel section arms meeting at a common center and having their corresponding horizontal flanges butt welded together at the center forming a unitary structure and their corresponding vertical webs cut out at their meeting ends to provide a longitudinal opening through the center of said X-bar, and a reenforcing plate for the upper flanges at the center, and another for the lower flanges, said reenforcing plates serving as welding dams and chills during welding of said flanges together and being welded in the joint therewith, and said arms being in substantial alignment across the center joint to provide for the transmission of stress from one arm directly to the one diagonally opposite.

3. In an automobile frame, an X-bar comprising a plurality of channel section arms meeting at a common center and having their corresponding horizontal flanges butt welded together at the center forming a unitary structure, a reenforcing plate for the upper flanges at the center, and another for the lower flanges, said reenforcing plates serving as welding dams and chills during welding of said flanges together and being welded in the joint therewith, and means integral with said vertical webs for supporting said reenforcing plates against said flanges during welding.

4. In an automobile frame, an X-bar comprising a plurality of channel section arms positioned to meet at a common center, having their corresponding horizontal flanges and opposite adjacent vertical webs butt welded at their respective meeting end edges, the vertical webs being cut away at their meeting ends to provide a longitudinal opening through the center of said X-bar, and reinforcing plates for said flanges, serving as welding dams and chills during the welding of said flanges together and being welded to said flanges by the same welds that join the flanges together.

DONALD W. SHERMAN.